(12) United States Patent
Beyer et al.

(10) Patent No.: US 9,053,848 B2
(45) Date of Patent: Jun. 9, 2015

(54) IMPULSE SOLENOID VALVE

(71) Applicant: Buerkert Werke GmbH, Ingelfingen (DE)

(72) Inventors: Olaf Beyer, Dresden (DE); Sebastian Kahl, Forchtenberg (DE); Martin Doerr, Ingelfingen (DE)

(73) Assignee: BUERKERT WERKE GMBH, Ingelfingen (DE)

( * ) Notice: Subject to any disclaimer, the term of this patent is extended or adjusted under 35 U.S.C. 154(b) by 0 days.

(21) Appl. No.: 14/050,592

(22) Filed: Oct. 10, 2013

(65) Prior Publication Data

US 2014/0104020 A1 Apr. 17, 2014

(30) Foreign Application Priority Data

Oct. 15, 2012 (DE) .................... 20 2012 009 830 U

(51) Int. Cl.
| | | |
|---|---|---|
| *H01F 7/00* | (2006.01) | |
| *H01F 7/16* | (2006.01) | |
| *F16K 31/08* | (2006.01) | |
| *F16K 31/06* | (2006.01) | |

(52) U.S. Cl.
CPC ............ *H01F 7/1615* (2013.01); *F16K 31/082* (2013.01); *F16K 31/06* (2013.01)

(58) Field of Classification Search
CPC ...... H01F 7/1615; F16K 31/06; F16K 31/082
USPC ........................................................ 335/229
See application file for complete search history.

(56) References Cited

U.S. PATENT DOCUMENTS

| | | | | |
|---|---|---|---|---|
| 4,127,835 A | * | 11/1978 | Knutson ........................ | 335/266 |
| 4,157,520 A | * | 6/1979 | Moates et al. ................ | 335/230 |
| 4,164,721 A | * | 8/1979 | Ishida et al. .................. | 335/234 |
| 4,191,937 A | * | 3/1980 | Koehler et al. ............... | 335/230 |
| 4,217,507 A | * | 8/1980 | Jaffe et al. ................. | 310/12.07 |
| 4,253,493 A | * | 3/1981 | English .................... | 137/625.18 |
| 4,306,207 A | * | 12/1981 | Tada et al. ..................... | 335/234 |
| 4,419,643 A | * | 12/1983 | Ojima et al. .................. | 335/234 |
| 4,422,060 A | * | 12/1983 | Matsumoto et al. .......... | 335/256 |
| 4,451,808 A | * | 5/1984 | Koehler ........................ | 335/229 |
| 4,524,797 A | * | 6/1985 | Lungu ........................... | 137/343 |
| 4,534,539 A | | 8/1985 | Dettmann | |
| 4,538,126 A | * | 8/1985 | Bando ............................ | 335/78 |

(Continued)

FOREIGN PATENT DOCUMENTS

| | | |
|---|---|---|
| DE | 3810154 A1 | 10/1989 |
| DE | 102006022561 A1 | 11/2007 |
| EP | 0101527 B1 | 5/1986 |

OTHER PUBLICATIONS

German Patent Office, Search Report for DE 20 2012 009 830.6, dated Jun. 6, 2013, 8 pages.

*Primary Examiner* — Shawki S Ismail
*Assistant Examiner* — Lisa Homza
(74) *Attorney, Agent, or Firm* — Stolowitz Ford Cowger LLP

(57) ABSTRACT

An impulse solenoid valve with at least one solenoid coil, a magnetically soft magnetic circuit which comprises a stationary yoke and a movable solenoid core, and with a permanent magnet which is accommodated in the magnetic circuit such that it sectionally interrupts the magnetic circuit, is characterized in that a first portion and a second portion of the magnetic circuit each directly contact the same on opposite sides of the permanent magnet, preferably over the full surface.

34 Claims, 3 Drawing Sheets

(56) References Cited

U.S. PATENT DOCUMENTS

| | | | |
|---|---|---|---|
| 4,550,302 A * | 10/1985 | Watanabe et al. | 335/228 |
| 4,560,966 A * | 12/1985 | Nagamoto et al. | 335/80 |
| 4,561,632 A * | 12/1985 | Hugler | 251/129.15 |
| 4,679,017 A * | 7/1987 | Mishler et al. | 335/164 |
| 4,706,055 A * | 11/1987 | Uetsuhara | 335/229 |
| 4,746,886 A * | 5/1988 | Uetsuhara | 335/230 |
| 4,751,487 A * | 6/1988 | Green, Jr. | 335/234 |
| 4,797,645 A * | 1/1989 | Uetsuhara | 335/230 |
| 4,835,503 A * | 5/1989 | Everett | 335/229 |
| 4,868,695 A * | 9/1989 | Quatro et al. | 360/256.3 |
| 4,903,578 A * | 2/1990 | Terp | 91/499 |
| 5,032,812 A * | 7/1991 | Banick et al. | 335/17 |
| 5,257,014 A * | 10/1993 | Zimmermann | 340/686.1 |
| 5,268,662 A * | 12/1993 | Uetsuhara et al. | 335/229 |
| 5,303,012 A * | 4/1994 | Horlacher et al. | 335/253 |
| 5,453,724 A * | 9/1995 | Seymour et al. | 335/172 |
| 5,523,684 A * | 6/1996 | Zimmermann | 324/207.22 |
| 5,556,175 A * | 9/1996 | Hayakawa et al. | 303/119.2 |
| 5,584,466 A * | 12/1996 | Fukano et al. | 251/65 |
| 5,809,157 A * | 9/1998 | Grumazescu | 381/412 |
| 5,850,170 A * | 12/1998 | Kern | 335/229 |
| 5,955,934 A * | 9/1999 | Raj | 335/277 |
| 5,969,589 A * | 10/1999 | Raj | 335/277 |
| 6,242,994 B1 * | 6/2001 | Li et al. | 335/277 |
| 6,265,956 B1 * | 7/2001 | Cascolan et al. | 335/234 |
| 6,293,516 B1 * | 9/2001 | Parsons et al. | 251/129.04 |
| 6,305,662 B1 * | 10/2001 | Parsons et al. | 251/129.04 |
| 6,321,781 B1 * | 11/2001 | Kurth | 137/554 |
| 6,450,478 B2 * | 9/2002 | Parsons et al. | 251/129.04 |
| 6,737,946 B2 * | 5/2004 | Seale et al. | 335/279 |
| 6,816,048 B2 * | 11/2004 | Morita et al. | 335/220 |
| 6,836,201 B1 * | 12/2004 | Devenyi et al. | 335/229 |
| 6,853,100 B2 * | 2/2005 | Yumita | 310/12.24 |
| 6,940,376 B2 * | 9/2005 | Morita et al. | 335/220 |
| 6,948,697 B2 * | 9/2005 | Herbert et al. | 251/129.04 |
| 7,075,398 B2 * | 7/2006 | Morita et al. | 335/220 |
| 7,280,019 B2 * | 10/2007 | Kolb et al. | 335/229 |
| 7,352,268 B2 * | 4/2008 | Wright et al. | 335/229 |
| 7,605,680 B2 * | 10/2009 | Matsumoto et al. | 335/229 |
| 7,864,008 B2 * | 1/2011 | Schilling | 335/257 |
| 7,871,060 B2 * | 1/2011 | Armour | 251/129.15 |
| 7,965,161 B2 * | 6/2011 | Roche | 335/229 |
| 7,969,772 B2 * | 6/2011 | Gubbins et al. | 365/164 |
| 8,013,698 B2 * | 9/2011 | Bonjean et al. | 335/229 |
| 8,093,969 B2 * | 1/2012 | Liu et al. | 335/78 |
| 8,106,734 B2 * | 1/2012 | Gruden | 335/229 |
| 8,159,807 B2 * | 4/2012 | Pohl | 361/160 |
| 8,193,887 B2 * | 6/2012 | Sohn | 335/299 |
| 8,567,440 B2 * | 10/2013 | Walter | 137/625.44 |
| 8,576,032 B2 * | 11/2013 | Herbert et al. | 335/229 |
| 8,581,682 B2 * | 11/2013 | Patino et al. | 335/229 |
| 2001/0023876 A1 * | 9/2001 | Estelle et al. | 222/146.5 |
| 2001/0026204 A1 * | 10/2001 | Petro | 335/229 |
| 2003/0030524 A1 * | 2/2003 | Sato et al. | 335/220 |
| 2004/0113730 A1 * | 6/2004 | Watanabe et al. | 335/220 |
| 2008/0179553 A1 * | 7/2008 | Walter | 251/65 |
| 2010/0123093 A1 * | 5/2010 | Beyer et al. | 251/129.15 |
| 2010/0289605 A1 * | 11/2010 | Beyer et al. | 335/229 |
| 2011/0267159 A1 * | 11/2011 | Schiepp et al. | 335/232 |
| 2014/0028420 A1 * | 1/2014 | Scanlon | 335/230 |

\* cited by examiner

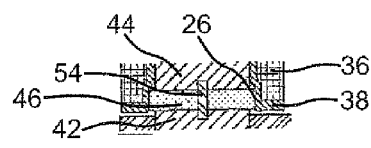
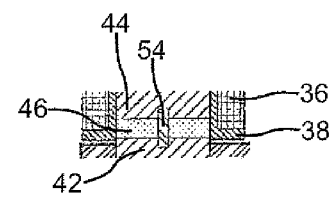
Fig. 2a  Fig. 2b
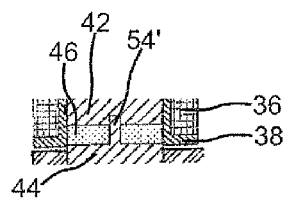
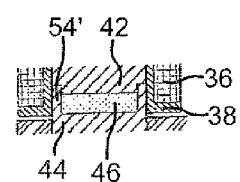
Fig. 2c  Fig. 2d
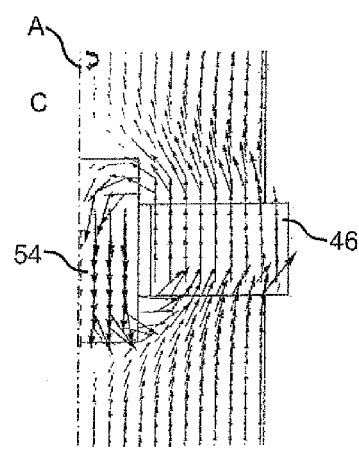
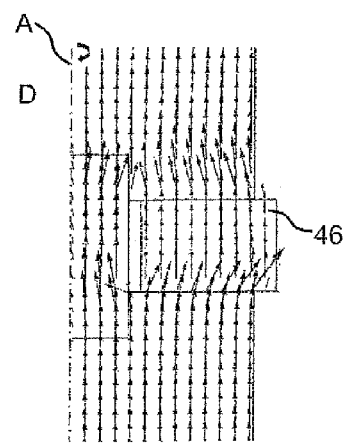
Fig. 3a  Fig. 3b

IMPULSE SOLENOID VALVE

CROSS-REFERENCE TO RELATED APPLICATION

This application claims priority to German Patent Application Serial No. 202012009830.6, filed on Oct. 15, 2012, the contents of which are herein incorporated by reference in their entirety.

FIELD OF THE INVENTION

This invention relates to an impulse solenoid valve.

BACKGROUND

Impulse solenoid valves are generally known. In these solenoid valves a permanent magnet usually is integrated, which in the provided switching positions for opening and closing the valves holds an actuating element in an end position. The advantage of impulse solenoid valves is that they are very energy-efficient, because only for switching a short current impulse is required. To an impulse solenoid coil a pick-up current or a release current each is supplied. In solenoid valves which are not designed as impulse solenoid valves, on the other hand, a permanent energization is required during operation.

EP 0 101 527 B1 for example shows an impulse solenoid valve with a permanent magnet arrangement, which around the outside of a core guiding tube is placed on its one end. A plurality of permanent magnets are inserted in a holder provided for this purpose.

It is the object of the invention to improve the known impulse solenoid valve.

SUMMARY

An impulse solenoid valve according to the invention comprises at least one solenoid coil, a magnetic circuit which includes a stationary yoke and a movable solenoid core, and a permanent magnet which is accommodated in the magnetic circuit such that it sectionally interrupts the magnetic circuit, wherein a first portion and a second portion of the magnetic circuit on opposite sides of the permanent magnet each directly contact the same, preferably over the full surface. The permanent magnet thereby is integrated into the magnetic circuit in a magnetically extremely efficient way, because between the adjoining magnetic circuit portions and the permanent magnet no air gap or an additional, interposed connecting means such as for example an adhesive layer is required. An adhesive layer would act as air gap weakening the magnetic force.

The magnetic circuit sectionally extends along an iron circuit.

The first and the second portion of the magnetic circuit in particular are directly connected with each other via a fastening element. It can be preferred that due to the fastening element the permanent magnet is clamped between opposed portions of the yoke, whereby air gaps are avoided.

In a preferred embodiment the permanent magnet and, if present, the fastening element are formed as parts of the stationary yoke. As a result, the permanent magnet and the fastening element are not exposed to mechanical loads, such as possibly occurring shocks during the switching process, which increases the stability of the system.

The permanent magnet and the fastening element can be arranged both in a yoke plate which is arranged within, above or below the solenoid coil, or in a yoke plate which is positioned beside the solenoid coil and is part of the magnetic circuit.

In general, one or more solenoid coils can be present.

Alternatively, however, it is also possible that the permanent magnet and the fastening element are arranged in the movable solenoid core. For stabilization, damping elements can be used.

In one embodiment, the fastening element is formed of a magnetic, in particular magnetically soft material. The magnetic circuit thereby is influenced and can be designed according to the respectively desired applications in dependence on the magnetic properties of the fastening element, as will be explained in detail below.

In impulse solenoid valves the magnetic flux of the magnetic circuit is generated in part by the permanent magnet and in part by the solenoid coil. Depending on the direction of the magnetic field lines of the permanent magnet and the field lines which are produced by the solenoid coil, the two magnetic fields are added or subtracted.

In dependence on the strength of the energization of the solenoid coil, the magnetic fastening element effects a splitting of the magnetic flux lines into a main flux and a secondary flux.

In the starting condition of the impulse solenoid valve according to the invention without energization of the solenoid coil, the magnetic force of the permanent magnet acts alone. Corresponding to the magnetic resistances, however, the magnetic flux is divided into a fraction, the main flux, which flows over the permanent magnet, the first portion of the magnetic circuit and the second portion of the magnetic circuit, wherein the field lines extend over the entire magnetic circuit, and into a fraction, the secondary flux, which flows over the permanent magnet, a part of the first portion of the magnetic circuit over the magnetic fastening element on the shortest route directly to the second portion of the magnetic circuit and again back to the permanent magnet.

Due to the secondary flux a higher magnetic force is achieved on switching in the end condition.

The secondary flux is a kind of magnetic short circuit of the two sections of the magnetic circuit and the permanent magnet through the magnetic fastening element.

When the solenoid coil is charged with a current in positive direction, i.e. the magnetic fluxes generated by the permanent magnet and by the solenoid coil extend in the same direction, the division of the magnetic flux into a main flux and a secondary flux fraction remains, as long as the magnetic flux generated by the solenoid coil is smaller than the magnetic flux generated by the permanent magnet.

When the solenoid coil current is increased to a value at which the magnetic flux generated by the solenoid coil is equally large as the one of the permanent magnet, there is no secondary flux and the entire magnetic flux extends along the entire magnetic circuit.

A further increase of the solenoid coil current leads to a greater increase of the entire magnetic force which is available in the magnetic circuit and which can be utilized for attracting an actuating element in the solenoid valve than without magnetically soft fastening element. In contrast to designs without magnetic fastening element, the magnetic fastening element bridges the permanent magnet.

Without the magnetically soft fastening element, the permanent magnet acts like an air gap for the fraction of the magnetic flux from the coils or the coil, when the magnetic flux generated by the solenoid coils is greater than the magnetic flux generated by the permanent magnet.

To achieve the release of the actuating element, the solenoid coil must be charged with a release current. Since the magnetic secondary flux decreases the magnetic force of the permanent magnet acting in the magnetic circuit, the required release current advantageously is lower than in an impulse solenoid valve without magnetic fastening element.

As compared to an impulse solenoid valve of a conventional construction, the magnetic fastening element creates the following advantageous technical effects: an increase of the available pick-up force, a reduction of the permanent magnet force in the magnetic circuit with a currentless coil in the released condition, and a lower release current is necessary.

In applications in which a very large holding force by the permanent magnet primarily is important, a fastening element of non-magnetic material should be used.

The fastening element preferably is formed as a solid body or a hollow body, in particular as pin, which connects the first and the second portion of the magnetic circuit with each other. A design of the fastening element as a separate pin simplifies the assembly. In addition, the pin has the advantage that it is easy to replace.

Depending on the material of which the pin is formed and depending on its geometry, such as its cross-section, the pin has more or less good magnetic properties, so that the secondary flux is weaker or stronger. Thus, the current-force relation can be designed for the specific application.

The pin in particular is a coiled spring pin, via which tolerances can be compensated very easily and which provides a secure hold in recesses in the associated portions of the yoke. The pin can be formed as separate part and protrude into recesses in opposed portions of the yoke, which form first and second portions of the magnetic circuit.

The fastening element can, however, also be a protrusion integrally molded to a portion of the yoke, which protrudes towards another portion of the yoke and directly contacts the same. It is also possible that the fastening element is not formed pin-shaped, but that it is formed by a part of the first or second portion of the yoke, for example as wall which partly surrounds the permanent magnet.

In one embodiment, the permanent magnet is arranged in a recess in the first or second portion of the magnetic circuit. The fastening element then is formed by a wall which surrounds the recess.

It is essential that the fastening element connects the first and the second portion of the magnetic circuit with each other and cooperates with the magnetic circuit.

In a preferred embodiment, the permanent magnet includes a through hole through which the fastening element extends.

The cross-sections of the through hole and the fastening element rather are equally or almost equally large, so that in the case that the fastening element is designed magnetic no harmful air gaps can form.

A formation of the pin as coiled spring pin has the advantage that only extremely small air gaps occur at the connecting points between the parts to be connected with each other, which has a favorable influence on the magnetic force available in the magnetic circuit.

With one end, the fastening element preferably engages into a recess of the first or second portion of the yoke. To minimize magnetic losses, air gaps are kept to a minimum. Parts included in the magnetic circuit are connected with each other as gap-free as possible, for example compressed.

In one embodiment, the permanent magnet is designed to be ring-shaped. Depending on the diameter of the opening, the magnetic force of the permanent magnet is weakened more or less. In this embodiment, radial air gaps are harmless.

The magnetic force of the permanent magnet determines the holding force of the impulse solenoid valve.

The solenoid coil preferably includes a coil body with flared end. The coil body surrounds parts of the stationary yoke and/or of the movable solenoid core. This part of the yoke can be formed as cylindrical, in particular circular cylindrical yoke bolt. Advantageously, the flared end accommodates the permanent magnet. The cross-sectional area of the permanent magnet therefore is larger than that of the yoke. Thus, the iron cross-section missing due to the through hole for the fastening element in the permanent magnet again can be more than compensated, which increases the magnetic force acting in the magnetic circuit.

The first and the second portion of the magnetic circuit are formed e.g. by a first and a second portion of the yoke, preferably by a first and a second portion of a yoke bolt or yoke plug. The first and the second portion are parts manufactured separate from each other, which are spaced by the permanent magnet.

The separately manufactured parts preferably are connected with each other only by the fastening element, wherein the permanent magnet is clamped between the parts.

The first portion and the second portion of the yoke bolt should have the same cross-section. When the permanent magnet protrudes radially beyond the outer circumference of the portions of the yoke bolt, the magnetic holding force of the permanent magnet can be increased.

Favorably, the impulse solenoid valve comprises two solenoid coils, which are spatially arranged next to each other and can be actuated separate from each other. Especially in impulse solenoid valves it is advantageous to have two solenoid coils available in the device. One coil can be used for generating the pick-up current and the other one for the release current. It is, however, also possible to use both coils for the pick-up current, when a large magnetic force is required. In addition, the two coils can be connected in series or in parallel, as required. The construction with two solenoid coils provides for a high flexibility with respect to an efficient energy management of the impulse solenoid valve.

When by contrast only one coil is used in conventional impulse solenoid valves, a pick-up winding and a release winding with opposite winding direction frequently are used, wherein the two windings are arranged one above the other. With a defined overall size, only half the winding space then is available for each winding, whereby the magnetic force of course is greatly reduced.

The present invention can, however, also be applied to embodiments with only one coil.

In one embodiment, the stationary yoke comprises two parallel spaced yoke plates, a preferably vertical yoke bolt connecting the same, and a yoke plug substantially parallel to the yoke bolt, wherein the yoke bolt and the yoke plug each are surrounded by a solenoid coil. In this arrangement, both solenoid coils are arranged within a common magnetic circuit. The number of the components can be reduced when using as many identical parts as possible, and the manufacturing costs thus can be kept low.

In one embodiment, the solenoid coil which surrounds the yoke plug accommodates a core guiding tube coaxial to the yoke plug, wherein the yoke plug closes one end of the core guiding tube and in the core guiding tube the solenoid core is opposed to the yoke plug and is movably arranged therein.

When two parallel coils are provided, in particular two identically constructed solenoid coils are used. However, the winding data of the solenoid coils can differ.

One or both of the solenoid coils are switchable as pick-up and/or release coil with respect to the magnet armature. Several possibilities exist to operate the coils, wherein a high power efficiency can be achieved.

The permanent magnet, the magnetic fastening element, the magnet yoke, the movable core and the at least one solenoid coil advantageously are adjusted to each other such that when applying an electric switching impulse to the at least one solenoid coil in a starting condition, a magnetic circuit corresponding to the main flux and a smaller magnetic circuit formed by the magnetic fastening element within the magnetic circuit, the secondary flux, are generated. Depending on the direction of energization, the small magnetic circuit can weaken or amplify the main circuit.

In a condition following the starting condition, a short circuit via the magnetic fastening element is eliminated and the magnetic circuit corresponding to the main magnetic circuit extends through the magnetic fastening element. The following condition is reached without the current intensity being increased from outside, the applied voltage remains the same, the current intensity through the coil changes automatically.

BRIEF DESCRIPTION OF THE DRAWINGS

FIGS. 2a to 2d show detail sections of various embodiments of the impulse solenoid valve according to the invention in the region of the permanent magnet, FIGS. 3a and 3b show enlarged half-sections in the region of the permanent magnet with magnetic field lines at a differently large magnetic flux generated by the solenoid coil.

DETAILED DESCRIPTION

Figure 1:
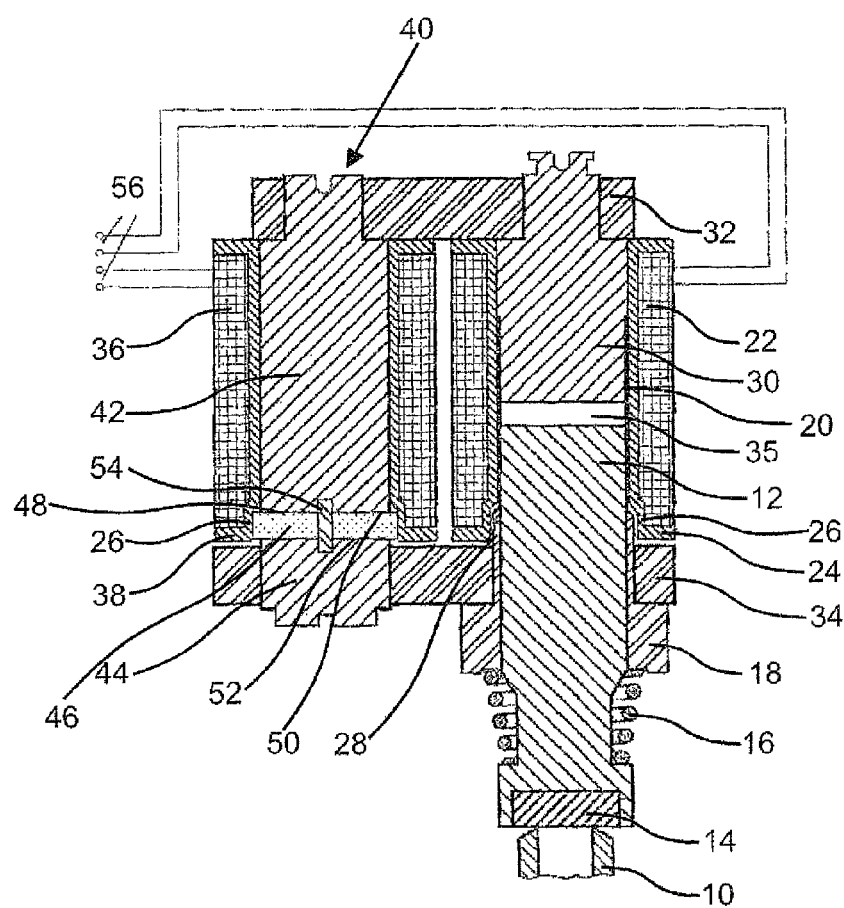
FIG. 1 shows a longitudinal sectional view through an embodiment of an impulse solenoid valve according to the invention.

FIG. 1 shows an impulse solenoid valve which operates with a lifting-armature drive. Symbolically, a sealing or valve seat 10 is shown, which for example forms an inflow or an outflow for a fluid and is shown as free end of a tube.

In the closed condition, a movable solenoid core 12 can press onto the valve seat 10, which at its end facing the valve seat 10 for example carries a sealing body 14 of a particular sealing material, for example of an elastic sealing material.

In the illustrated embodiment, the movable solenoid core 12, also referred to as lifting armature, is biased in direction of the closed position by a compression spring 16 sectionally surrounding the same.

A pole sleeve 18 surrounds the solenoid core 12 and at the same time serves as support for the spring 16. The pole sleeve 18 is adjoined by a so-called core guiding tube 20 which in the illustrated embodiment is indicated as thick line. The pole sleeve 18 and the core guiding tube 20 can integrally be connected with each other. The pole sleeve is made of magnetic material, the core guiding tube of non-magnetic material. Pole sleeve 18 and core guiding tube 20 among other things serve as bearing and contact surface for the solenoid core 12 sliding in them.

With one end, the solenoid core 12 protrudes into a first coil 22, also referred to as core coil. The coil 22 is wound up onto a tubular coil body 24 which on the inside adjoins the core guiding tube 20.

In the region of the valve-seat-side end of the coil body 24 the same is provided with a flare 26, wherein this flare 26 is provided to accommodate a sleeve-shaped extension 28 of the pole sleeve 18.

The flare 26 at the coil body 24 allows that the pole sleeve partly protrudes into the coil body 24 and into the coil 22, whereby the magnetic transition resistance to the core is reduced.

At its end opposite the valve seat 10, the core guiding tube 20 is closed by a so-called yoke plug 30 which likewise is arranged in the coil 22, but partly protrudes from the same, namely upwards into a yoke bridge 32 which preferably is formed plate-shaped.

Between the yoke plug 30 and the movable solenoid core 12 an air gap 35 is present, which depending on the switching condition is differently large or even disappears.

A likewise plate-shaped yoke bridge 34 preferably parallel to the yoke bridge 32 at the opposite end of the coil 22 accommodates the extension 28 of the pole sleeve 18. Between these parts a contact exists, so that here no air gap is present.

Substantially parallel to the first coil 22 a second coil 36 (yoke coil) is provided, which is wound up on a coil body 38 which preferably is formed identical to the coil body 24 in terms of shape, geometry and dimensions, so that here identical parts can be used.

Preferably, the coil 36 is constructed identical to the coil 22.

The coils 22, 36 are magnetically coupled with each other by the yoke bridges 32, 34 and by a multi-piece yoke bolt 40 which extends from a yoke bridge 32 to the opposed yoke bridge 34 and preferably protrudes into the same.

The yoke bolt 40 is arranged substantially parallel to the yoke plug 30.

As explained, the yoke bolt 40 has a multi-piece design with a first portion 42, which has a first bolt-like part which according to the non-limiting embodiment according to FIG. 1 extends from the yoke bridge 32 approximately up to the yoke bridge 34.

A second portion 44, equivalent to a second portion of the yoke bolt 40, extends through the yoke bridge 34.

A permanent magnet 46, here in the form of a disk, more exactly a ring disk, is arranged between the two portions 42, 44.

With one side 48, which in the present case is a planar end face, the permanent magnet 46 fully contacts an opposed end face 50 of the portion 42, without an air gap or an adhesive or the like being provided between the two parts. On the opposite side 52, which preferably likewise is planar and located parallel to the side 48, the permanent magnet 46 fully contacts the portion 44 of the yoke bolt 40, i.e. the corresponding separate part. Here as well, a full-surface contact is present without an air gap or without an adhesive or the like between these parts.

The fixation of the portions 42, 44 and the corresponding parts of the yoke bolt 40 is effected via one or more fastening elements 54.

These fastening elements 54 can be designed in different ways.

In the embodiment shown in FIG. 1, the fastening element 54 is a separate pin which extends through a through hole in the permanent magnet 46 and preferably protrudes into complementary, end-face recesses in the portions 42, 44 and is pressed into the same.

The preferred embodiment provides that the pin is designed as a coiled spring pin. The portions 42, 44 are permanently connected with each other only by the pin, by generating a clamping force on the permanent magnet 46. Further fastening means for locking the portions 42, 44 and the permanent magnet are not provided.

The illustrated construction provides a magnetic circuit, here an iron circuit, which is composed of the yoke bridges 32, 34 (here yoke plates) each made of magnetically soft material, the yoke plug 30, the movable solenoid core 12, the pole sleeve 18 and the portions 42, 44 of the magnetic bolt 40. The solenoid core 12 forms the movable part of the magnetic circuit. The remaining parts (18, 30, 32, 34, 42, and 44) form the stationary yoke.

The permanent magnet 46 is integrated into the magnetic circuit very efficiently. The first portion 42 and the second portion 44 form magnetic circuit portions between which the permanent magnet 46 is seated, without an air gap being present between the magnetic circuit portions and the permanent magnet 46.

The permanent magnet 46 also might be present in other portions of the magnetic circuit, i.e. in the yoke.

Due to the fact that the permanent magnet 46 is accommodated in the stationary part of the yoke and not in the movable part, namely the movable solenoid core 12, it is not exposed to external mechanical loads during switching of the valve.

Reference numeral 56 designates the electrical connections of the coils 22, 36.

Since the two coil bodies 24, 38 have an identical design, the coil body 38 also has a flare 26. This flare 26 can be utilized to increase the outside diameter of the permanent magnet 46, which in this region protrudes beyond the outer circumference of the first and second portions 42, 44, with the cross-sections of the portions 42, 44 being identical. Due to the through hole for the fastening element 54 a smaller surface area and a smaller volume of the permanent magnet 46 are obtained, which is compensated again by the radial increase of the magnet 46 into the flare 26, so that the holding force again is increased.

In the illustrated embodiment, the permanent magnet 46 contacts the tubular coil body 38 on its outer circumference in the region of the flare 26.

In the illustrated embodiment, the solenoid coils 22, 36 are actuatable separate from each other, wherein one or both of the solenoid coils are usable as pick-up and/or release coil, i.e. as coils which are usable for lifting off the solenoid core 12 from the sealing seat 10 or for pressing the solenoid core 12 against the sealing seat 10.

The fastening element 54 can be formed of a magnetic, preferably magnetically soft material or also be non-magnetic, which provides different effects, as will yet be explained in detail below.

Due to the fact that in the illustrated embodiment the fastening element 54 is a separate part, here a separate pin, dimensional and positional tolerances can be compensated very easily, in order to connect the portions 42, 44 with each other by interposition of the permanent magnet 46.

In FIG. 2a, the coupling of the portions 42, 44 of the yoke bolt 40 according to the embodiment of FIG. 1 is shown once again.

The embodiment of FIG. 2b corresponds to the one of FIG. 2a, wherein here however the coil body 38 has no flare as in FIG. 2a, but has a constant diameter on the inside. Correspondingly, the outside dimensions of the permanent magnet 46 here are identical to those of the portions 42, 44.

The fastening element 54 also can be designed as in FIG. 2a, i.e. as a separate pin, preferably a coiled spring pin, which can be made of a magnetic or non-magnetic material and is locked in place at the portions 42, 44 exclusively by press fits, without adhesive or the like.

The embodiment of FIG. 2c provides not separate fastening element 54, but a fastening element 54' in the form of a protrusion protruding from the portion 44, which protrudes into a recess in the portion 42 and is fixed there, for example likewise via a press fit.

In the embodiment of FIG. 2d there is provided either a plurality of fastening elements 54' provided at the edge in the form of integral tabs at the portion 44. Alternatively, the fastening element 54' can be designed as an annular tab which likewise is integrally molded to the portion 44. The annular tab then accommodates the permanent magnet 46.

In these embodiments, too, it is always provided that the permanent magnet 46 directly and fully rests against the portions 42, 44 of the yoke bolt without an air gap, without adhesive or the like.

The embodiment according to FIGS. 3a and 3b, which each show a half-section on one side of the middle axis A of the yoke bolt 40 in the region of the permanent magnet 46, has a fastening element 54 of magnetic material, in particular magnetically soft material. A magnetic bypass is formed thereby, so that the fastening element has a dual function.

The mode of operation of the solenoid valve will be explained first with and then without bypass.

In the starting condition, which is shown in FIG. 1, both coils 22, 36 are without current, the sealing seat 10 is closed, since the spring 16 urges the movable solenoid core 12 against the sealing seat 10.

The permanent magnet 46 is aligned such that the holding force exerted by the same is directed in a lift-off direction of the movable core 12. The force required for lifting off, however, is not sufficient in the starting condition.

By applying a pick-up voltage to one or both coils 22, 36, a magnetic field is built up in the magnetic circuit, which is directed parallel to the field of the permanent magnet 46. The entire magnetic force in the magnetic circuit becomes greater than the oppositely directed spring force, so that the movable solenoid core 12 is lifted and moves in direction of the plug 30. The air gap 35 preferably is closed. In the now open condition of the valve, an energization of the coils 22, 36 no longer is necessary, since the holding force of the permanent magnet 46 is sufficient to hold the solenoid core 12 attracted against the force of the spring 16.

During release, i.e. closing of the valve, a so-called release current is supplied to the coil or coils 22, 36, which flows in opposite direction to the so-called pick-up current, whereby a magnetic field is built up in the magnetic circuit, which is directed opposite to the field of the permanent magnet 46. As soon as the entire magnetic force is smaller than the oppositely directed spring force, the solenoid core 12 drops off into its starting position.

The preferred embodiment of the invention provides that during pick-up the coils 22, 36 are connected in parallel and during release only one coil is energized, preferably the core coil 22. With the parallel connection during pick-up greater magnetic forces are produced as compared to a conventional single-coil solution, which provides for greater nominal widths or can be converted into higher pressures to be switched.

The particularity of the fastening elements 54 in the form of pins consists in that these pins allow for the adjustment of the valve to different application requirements in a very easy and inexpensive way. This can be effected via the geometry, but also via the material properties of the pin.

Figure 4:
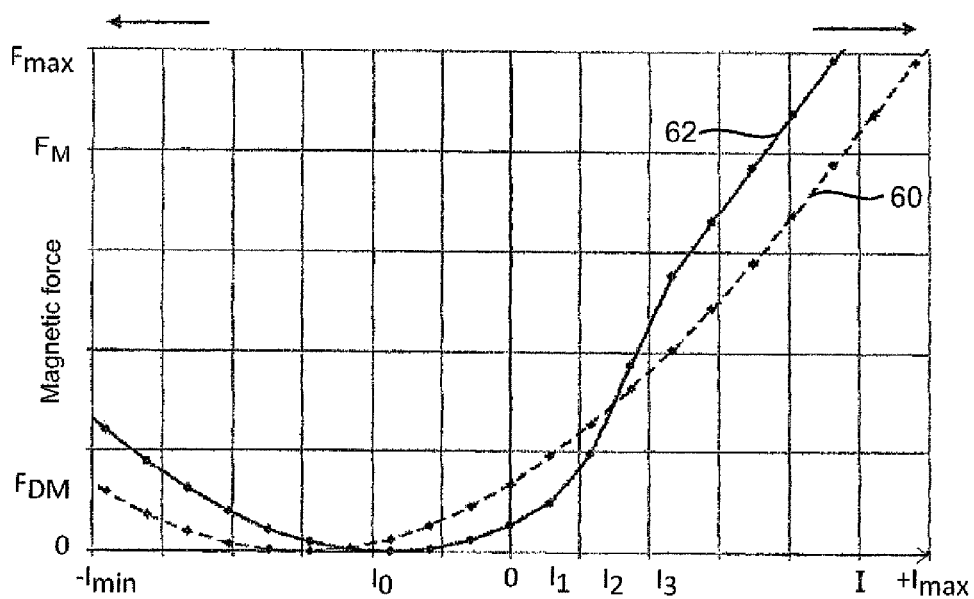
FIG. 4 shows a diagram which shows the magnetic force in dependence on the solenoid coil current.

FIG. 4 shows the course of the magnetic force MF in the magnetic circuit, namely with the curve 60 the course with a fastening element 54 of non-magnetic material. On the X-axis the current flow I through the coils is shown. When no voltage is applied and the current intensity is 0, the permanent magnet 46 ensures a certain magnetic force. When one or both of the coils 22, 36 subsequently are energized such that the magnetic field generated thereby in the yoke plug 40 is directed parallel to that of the permanent magnet, the magnetic force increases continuously. This is represented by the right half of the curve 60.

When one or both of the coils 22, 36 is energized in the opposite direction, the entire magnetic force in the magnetic circuit first drops, namely until reaching the zero value of the magnetic force, in order to subsequently rise again. It should, however, be noted that at the moment from which the magnetic force becomes smaller than the counteracting spring force, the movable core drops off and the valve is closed. The subsequent rise of the magnetic force above a critical value with increasing amount of the release current can be prevented by a coil design adapted thereto. In the coil design care must be taken that the coil resistance is so large that the coil current and hence the magnetic force does not rise above the critical value which would lead to an inadvertent re-attraction of the movable core. The stationary end value of the switch-off current at the end of the release impulse therefore should be close to $I_0$.

When the fastening element 54 is made of magnetic material, as shown in FIGS. 3a and 3b, a magnetic bypass is obtained via the fastening element 54, see FIG. 3a. There are magnetic lines (see flux density vectors in FIG. 3a) which reach from one side of the permanent magnet 46 directly over the fastening element 54 to the opposite side and do not extend along the magnetic circuit over the yoke.

The magnetic bypass leads to a more or less pronounced reduction of the holding force. When the coils 22, 36 thus are energized in the so-called positive direction, i.e. to the right as shown in FIG. 4, to support the permanent magnet 46, the magnetic flux fraction produced by the permanent magnet in the iron core is superimposed in the same direction by the magnetic flux produced by the coils 22, 36 (FIG. 3a). The conditions at the bypass remain as shown in FIG. 3a, as long as the magnetic flux produced by the coils 22, 36 is smaller than the magnetic flux of the permanent magnet 46 (see the flux density vectors in FIG. 3a). Up to this time it can be seen with reference to FIG. 4 that the magnetic force at the curve 62, which shows the corresponding impulse solenoid valve with magnetic fastening element 54, is smaller than at the curve 60. When the current intensity reaches the value 12, a point is reached at which the permanent magnetic flux and the magnetic flux produced by the coils 22, 36 are equally large. Hence, no more magnetic flux goes over the preceding bypass.

With further increasing current intensity (see FIG. 3b) the direction of the magnetic field in the fastening element 54 changes. With reference to the curve shown in FIG. 4 it can be seen that the magnetic fastening element 54 has positive effects on the course of the curve, in that it increases the pick-up force and shifts the curve and the zero point of the magnetic force. With the design of the fastening element 54 via magnetic material, cross-sectional area or also in that the fastening element selectively is made of solid material or as hollow body, the so-called force-current curve can be adapted as desired. The requirements of the respective application hence can be satisfied very easily without this having an effect on the remaining parts.

The invention claimed is:

1. An impulse solenoid valve, comprising:
   at least one solenoid coil;
   a magnetically soft magnetic circuit which includes a stationary yoke and a movable solenoid core; and
   a permanent magnet which is accommodated in the magnetic circuit such that it sectionally interrupts the magnetic circuit, wherein a first portion and a second portion of the magnetic circuit on opposite sides of the permanent magnet each directly contact the permanent magnet, wherein the first and the second portions of the magnetic circuit are formed by a first portion and a second portion of a yoke bolt or yoke plug, and wherein the first and the second portions of the yoke bolt or yoke plug are parts manufactured separately from each other and are spaced by the permanent magnet.

2. The impulse solenoid valve according to claim 1, wherein the first and the second portions of the magnetic circuit are directly connected with each other via at least one fastening element.

3. The impulse solenoid valve according to claim 2, wherein the permanent magnet and the fastening element are arranged in the stationary yoke.

4. The impulse solenoid valve according to claim 2, wherein the fastening element is magnetic or non-magnetic.

5. The impulse solenoid valve according to claim 2, wherein the fastening element is formed as a solid body or a hollow body, which connects the first and the second portions of the magnetic circuit with each other.

6. The impulse solenoid valve according to claim 2, wherein the fastening element is one of a separate component and a protrusion integrally molded to a portion of the stationary yoke, the protrusion protruding to another portion of the stationary yoke and directly contacts the portion of the stationary yoke.

7. The impulse solenoid valve according to claim 2, wherein the permanent magnet includes a through hole through which the fastening element extends.

8. The impulse solenoid valve according to claim 2, wherein the fastening element with one end engages into a recess in at least one of the first and the second portions of the yoke bolt or yoke plug.

9. The impulse solenoid valve according to claim 2, wherein the permanent magnet, the magnetic fastening element, and the magnetic circuit are adjusted to each other such that when applying an electric switching impulse to the at least one solenoid coil in a starting condition, a main flux associated with the magnetic circuit may be weakened or amplified by a secondary flux associated with a second magnetic circuit formed by the magnetic fastening element within the magnetic circuit.

10. The impulse solenoid valve according to claim 9, wherein, in a condition following the starting condition and while still applying the electric switching impulse, the secondary flux forms a magnetic short circuit between the magnetic circuit and the permanent magnet through the magnetic fastening element.

11. The impulse solenoid valve according to claim 1, wherein the first and the second portions of the magnetic circuit comprise a first portion and a second portion of the stationary yoke.

12. The impulse solenoid valve according to claim 11, wherein the permanent magnet is arranged in a recess in at least one of the first and the second portions of the stationary yoke.

13. The impulse solenoid valve according to claim 1, wherein the separately manufactured parts are attached to each other only by the fastening element and the permanent magnet is clamped between the parts.

14. The impulse solenoid valve according to claim 1, wherein the first and the second portions of the yoke bolt or yoke plug have the same cross-section and the permanent magnet protrudes radially beyond the outer circumference of the first and the second portions of the yoke bolt or yoke plug.

15. The impulse solenoid valve according to claim 1, wherein the permanent magnet is formed as plate-shaped or ring-shaped.

16. The impulse solenoid valve according to claim 1, wherein the impulse solenoid valve comprises two solenoid coils associated to the magnetic circuit, which are spatially arranged next to each other and are actuatable separately from each other.

17. The impulse solenoid valve according to claim 16, wherein the two solenoid coils are wound around coil bodies which are identical in construction.

18. An impulse solenoid valve comprising:
   at least one solenoid coil;
   a magnetically soft magnetic circuit which includes a stationary yoke and a movable solenoid core; and
   a permanent magnet which is accommodated in the magnetic circuit such that it sectionally interrupts the magnetic circuit, wherein a first portion and a second portion of the magnetic circuit on opposite sides of the permanent magnet each directly contact the permanent magnet, and wherein the solenoid coil extends around a coil body, which at one end has a flare which accommodates one of a pole sleeve and the permanent magnet.

19. The impulse solenoid valve according to claim 18, wherein the first and the second portions of the magnetic circuit are directly connected with each other via at least one fastening element.

20. The impulse solenoid valve according to claim 19, wherein the permanent magnet and the fastening element are arranged in the stationary yoke.

21. The impulse solenoid valve according to claim 19, wherein the fastening element is magnetic or non-magnetic.

22. The impulse solenoid valve according to claim 19, wherein the fastening element is formed as a solid body or a hollow body, which connects the first and the second portions of the magnetic circuit with each other.

23. The impulse solenoid valve according to claim 19, wherein the fastening element is one of a separate component and a protrusion integrally molded to a portion of the stationary yoke, the protrusion protruding to another portion of the stationary yoke and directly contacts the portion of the stationary yoke.

24. The impulse solenoid valve according to claim 19, wherein the permanent magnet includes a through hole through which the fastening element extends.

25. The impulse solenoid valve according to claim 18, wherein the impulse solenoid valve comprises two solenoid coils associated to the magnetic circuit, which are spatially arranged next to each other and are actuatable separately from each other.

26. The impulse solenoid valve according to claim 25, wherein the two solenoid coils are wound around coil bodies which are identical in construction.

27. An impulse solenoid valve comprising:
   at least one solenoid coil;
   a magnetically soft magnetic circuit which includes a stationary yoke and a movable solenoid core; and
   a permanent magnet which is accommodated in the magnetic circuit such that it sectionally interrupts the magnetic circuit, wherein a first portion and a second portion of the magnetic circuit on opposite sides of the permanent magnet each directly contact the permanent magnet, and wherein the stationary yoke comprises two parallel spaced yoke bridges, a yoke bolt connecting the yoke bridges, and a yoke plug spaced from the yoke bolt, wherein the yoke bolt and the yoke plug each are surrounded by a solenoid coil.

28. The impulse solenoid valve according to claim 27, wherein the solenoid coil which surrounds the yoke plug accommodates a core guiding tube coaxial to the yoke plug, and in the core guiding tube the movable solenoid core is opposed to the yoke plug and is movably arranged therein.

29. The impulse solenoid valve according to claim 27, wherein the first and the second portions of the magnetic circuit are directly connected with each other via at least one fastening element.

30. The impulse solenoid valve according to claim 29, wherein the permanent magnet and the fastening element are arranged in the stationary yoke.

31. The impulse solenoid valve according to claim 29, wherein the fastening element is magnetic or non-magnetic.

32. The impulse solenoid valve according to claim 29, wherein the fastening element is formed as a solid body or a hollow body, which connects the first and the second portions of the magnetic circuit with each other.

33. The impulse solenoid valve according to claim 29, wherein the fastening element is one of a separate component and a protrusion integrally molded to a portion of the stationary yoke, the protrusion protruding to another portion of the stationary yoke and directly contacts the portion of the stationary yoke.

34. The impulse solenoid valve according to claim 29, wherein the permanent magnet includes a through hole through which the fastening element extends.

* * * * *